(12) United States Patent
Mochizuki et al.

(10) Patent No.: US 10,608,228 B2
(45) Date of Patent: Mar. 31, 2020

(54) BUSBAR MODULE AND BUSBAR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Koichiro Mochizuki, Mie (JP); Osamu Nakayama, Mie (JP); Kotaro Takada, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 16/174,386

(22) Filed: Oct. 30, 2018

(65) Prior Publication Data
US 2019/0140244 A1    May 9, 2019

(30) Foreign Application Priority Data
Nov. 8, 2017 (JP) .................................. 2017-215335

(51) Int. Cl.
*H01M 2/20* (2006.01)
*H01M 2/22* (2006.01)
*H01R 4/02* (2006.01)

(52) U.S. Cl.
CPC ........... *H01M 2/202* (2013.01); *H01M 2/204* (2013.01); *H01M 2/206* (2013.01); *H01M 2/22* (2013.01); *H01R 4/027* (2013.01)

(58) Field of Classification Search
CPC combination set(s) only.
See application file for complete search history.

(56) References Cited

U.S. PATENT DOCUMENTS

| 4,842,534 | A  | * | 6/1989  | Mobley  | H01H 85/2035 337/191 |
|-----------|----|---|---------|---------|----------------------|
| 6,146,788 | A  | * | 11/2000 | Ikeda   | H01M 2/206 429/121   |
| 6,240,637 | B1 | * | 6/2001  | Ikeda   | H01M 2/206 29/854    |
| 6,346,011 | B1 | * | 2/2002  | Ikeda   | H01M 2/1077 439/500  |
| 6,407,337 | B1 | * | 6/2002  | Ogawa   | B60R 16/0215 174/154 |
| 6,476,705 | B1 | * | 11/2002 | Betti   | B60R 16/02 337/161   |

(Continued)

FOREIGN PATENT DOCUMENTS

JP     2014-229585     12/2014

*Primary Examiner* — William H. Mayo, III
*Assistant Examiner* — Krystal Robinson
(74) *Attorney, Agent, or Firm* — Gerald E. Hespos; Michael J. Porco; Matthew T. Hespos

(57) ABSTRACT

A busbar module (10) includes a busbar (11) having a plate-like body (12) electrically connectable to battery cells (30), a barrel (16) composed of a cut-and-raised portion (15) formed on the plate-like body (12) and a wire (20) fixed to the barrel (16). Integration of the plate-like body (12) to be connected to the battery cells (30) and the barrel (16) to be fixed to the wire (20) achieves a weight reduction.

9 Claims, 6 Drawing Sheets

(56) References Cited

U.S. PATENT DOCUMENTS

| | | | |
|---|---|---|---|
| 6,934,164 B2* | 8/2005 | Higuchi | H01H 85/044 361/752 |
| 7,612,647 B2* | 11/2009 | Onoda | H01H 85/2045 337/159 |
| 8,785,781 B2* | 7/2014 | Park | H01M 2/20 174/84 R |
| 9,023,499 B2* | 5/2015 | Takase | H01M 2/1077 429/90 |
| 10,236,496 B2* | 3/2019 | Nakayama | H01G 11/18 |
| 10,297,808 B2* | 5/2019 | Saito | H01M 2/206 |
| 10,326,218 B2* | 6/2019 | Hirooka | H01R 4/72 |
| 2012/0019061 A1* | 1/2012 | Nishihara | H01M 2/1077 307/10.1 |
| 2013/0280959 A1* | 10/2013 | Takase | H01M 2/1077 439/627 |
| 2016/0072113 A1 | 3/2016 | Ogasawara et al. | |
| 2016/0268578 A1* | 9/2016 | Ichikawa | H01M 2/206 |
| 2016/0268702 A1* | 9/2016 | Ichikawa | H01M 2/202 |

* cited by examiner

US 10,608,228 B2

BUSBAR MODULE AND BUSBAR

BACKGROUND

Field of the Invention

The invention relates to a busbar module and a busbar.

Related Art

Japanese Unexamined Patent Publication No. 2014-229585 discloses a busbar module with a busbar for connecting electrodes of adjacent battery cells and a voltage detection terminal for detecting voltages of the electrodes. A wire is connected to the voltage detection terminal by crimping and is connectable to a voltage detection circuit. The voltage detection terminal is laminated on the upper surface of the busbar that is to be connected electrically to the battery cells. Thus, there is a problem of increasing weight by the weight of the laminated voltage detection terminal.

The invention was completed on the basis of the above situation and aims to realize a weight reduction.

SUMMARY

The invention is directed to a busbar module with a busbar including a plate-like body that is electrically connectable to battery cells. A barrel is formed on the plate-like body and is composed of a cut-and-raised portion. The barrel is fixed to a wire or is configured to be fixed to a wire.

The plate-like body that is to be connected to the battery cells is integrated with the barrel that is to be fixed to the wire. Thus, weight can be reduced as compared to the case where a component to be connected to the battery cells and a component to be fixed to the wire are provided separately. Further, the barrel has the cut-and-raised portion formed by cutting and raising a part of the plate-like body. The cut-and-raised portion may be cantilevered from the plate-like body so that a cut is formed in an area of the plate-like body adjacent to the cut-and-raised portion. Thus, the weight of the busbar is reduced by the cut.

The plate-like body may be connected to the battery cells by welding. Additionally, a cut-and-raised hole may be open in the plate-like body by forming the cut-and-raised portion and may expose a part of the battery cell when the plate-like body is connected to the battery cells. According to this configuration, a positional relationship of the battery cell and the busbar can be confirmed by seeing the battery cell through a through hole.

A supporting wall may be disposed along an outer part of the plate-like body, and the cut-and-raised portion may be in an area of the plate-like body adjacent the supporting wall. The wire may be sandwiched between the barrel and the supporting wall. According to this configuration, the wire can be fixed reliably between the barrel and the supporting wall.

An insulation coating of the wire surrounding a core may be fixed to the barrel, and the core may be fixed conductively to the supporting wall. According to this configuration, a step of fixing the insulation coating and a step of fixing the core can be performed reliably without interfering with each other.

The busbar may be stamped such that burrs are produced on a top surface area not to be brought into contact with the battery cells, and the barrel may be bent so that a back surface of the plate-like body is in contact with the wire. According to this configuration, damage to the wire by the burrs can be prevented.

The plate-like body may be substantially rectangular. The barrel may be disposed substantially at a center of one straight side part constituting an outer edge of the plate-like body, and an axis of the wire may be substantially parallel to the one side part may be fixed to the barrel. Thus, the wire need not be bent with an extremely small radius of curvature regardless of whether the wire is to be drawn out from the barrel toward one side or the other.

DETAILED DESCRIPTION

Figure 1:
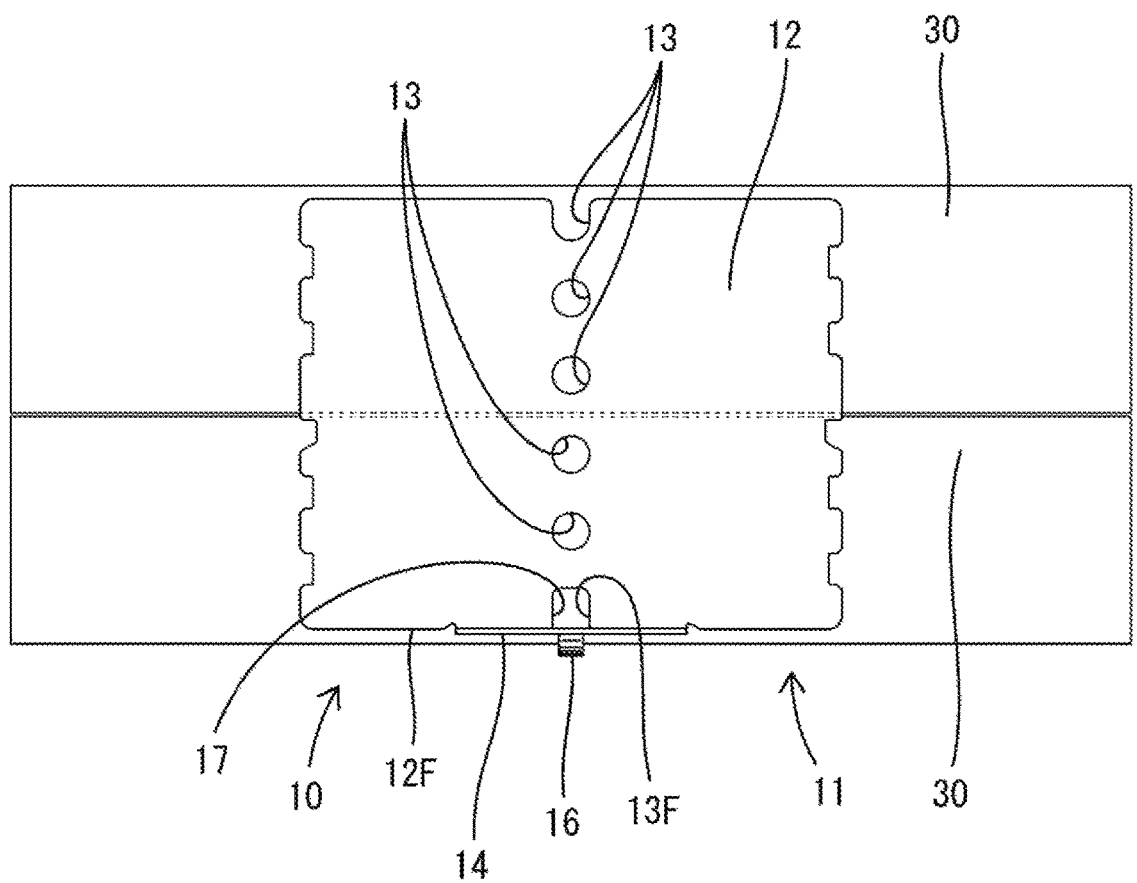
FIG. 1 is a plan view showing a state where a busbar having no wire connected thereto is mounted on battery cells in one embodiment.
Figure 2:
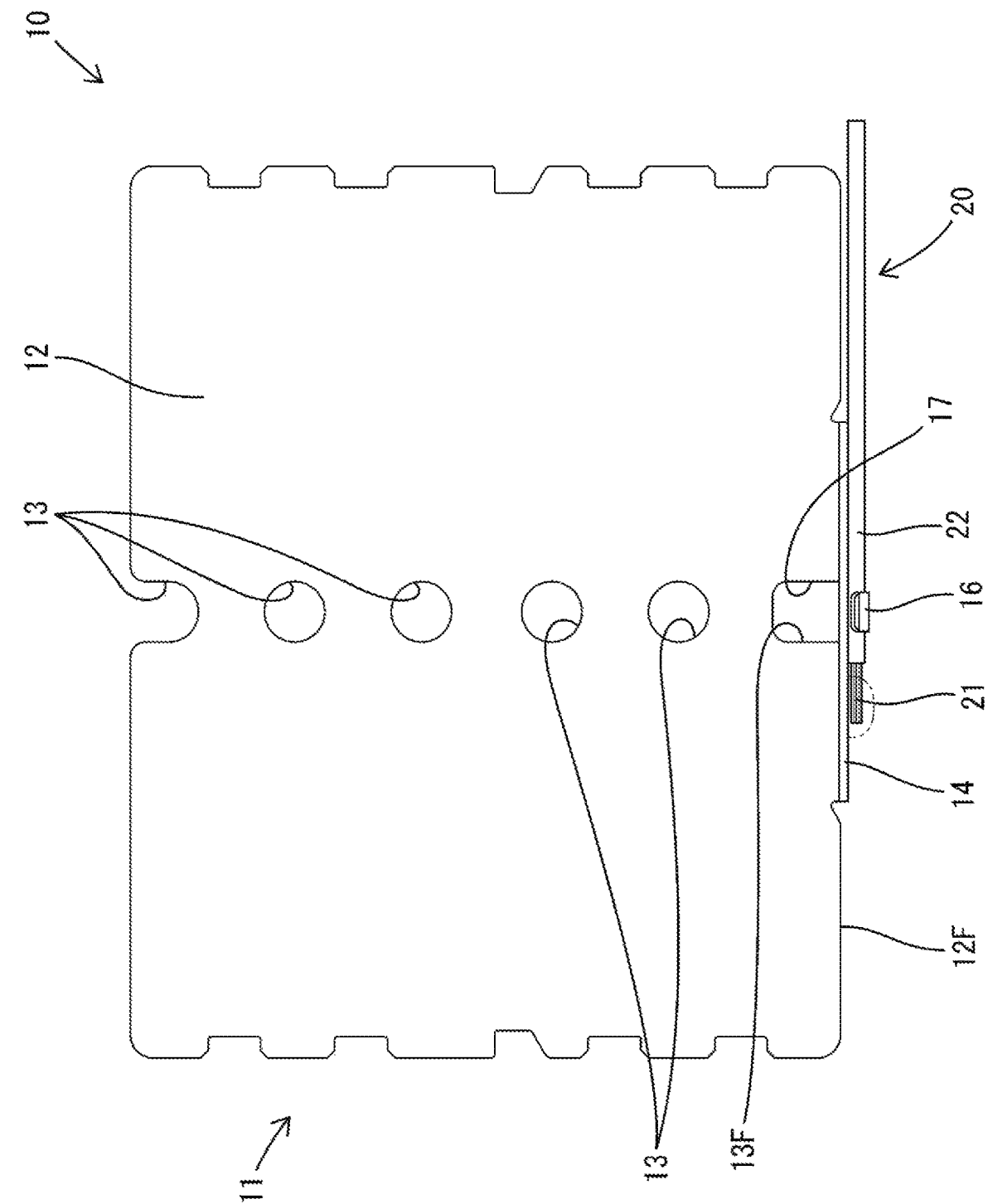
FIG. 2 is a plan view of a busbar module.
Figure 3:
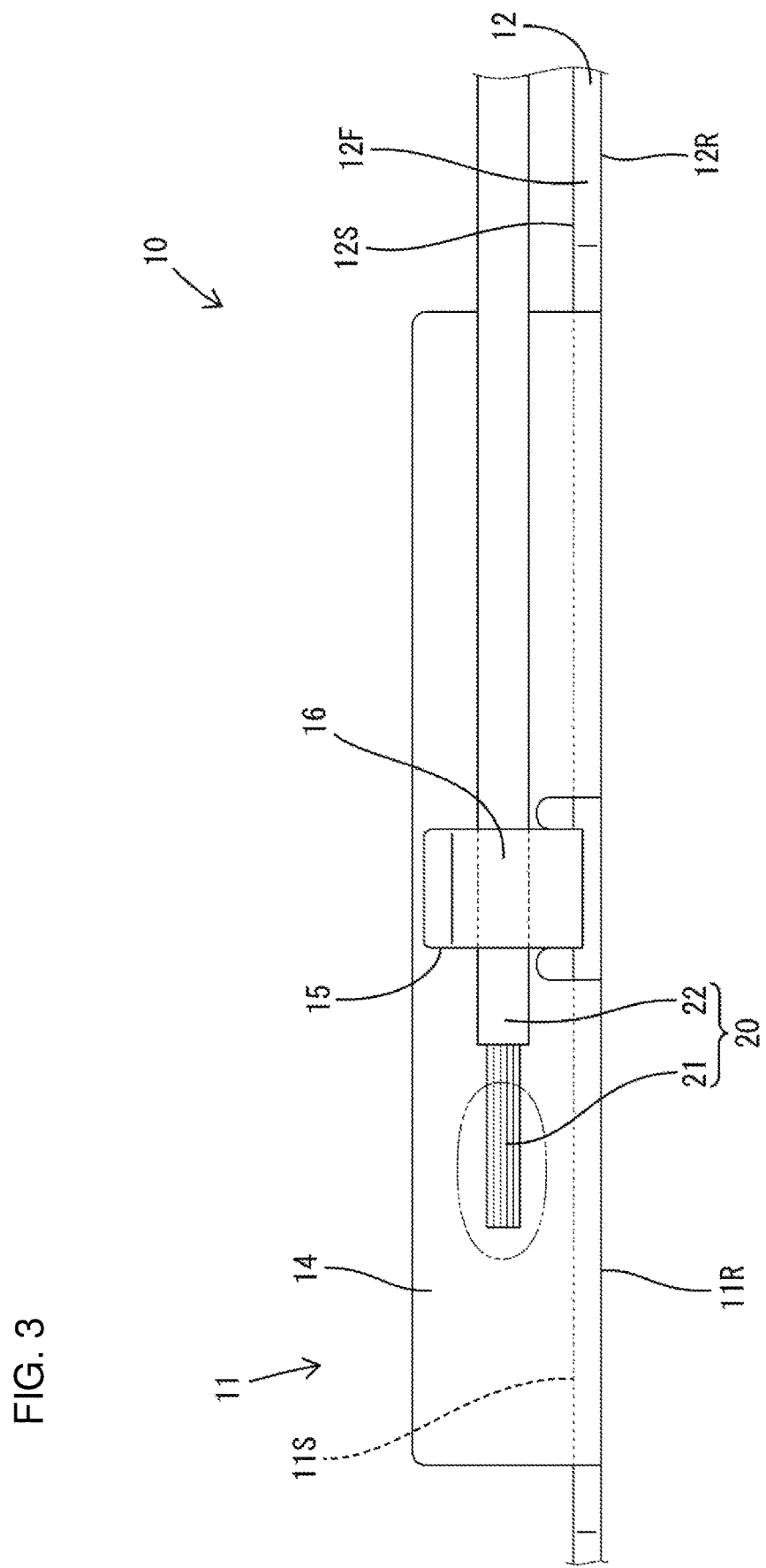
FIG. 3 is a partial enlarged front view of the busbar module.
Figure 4:
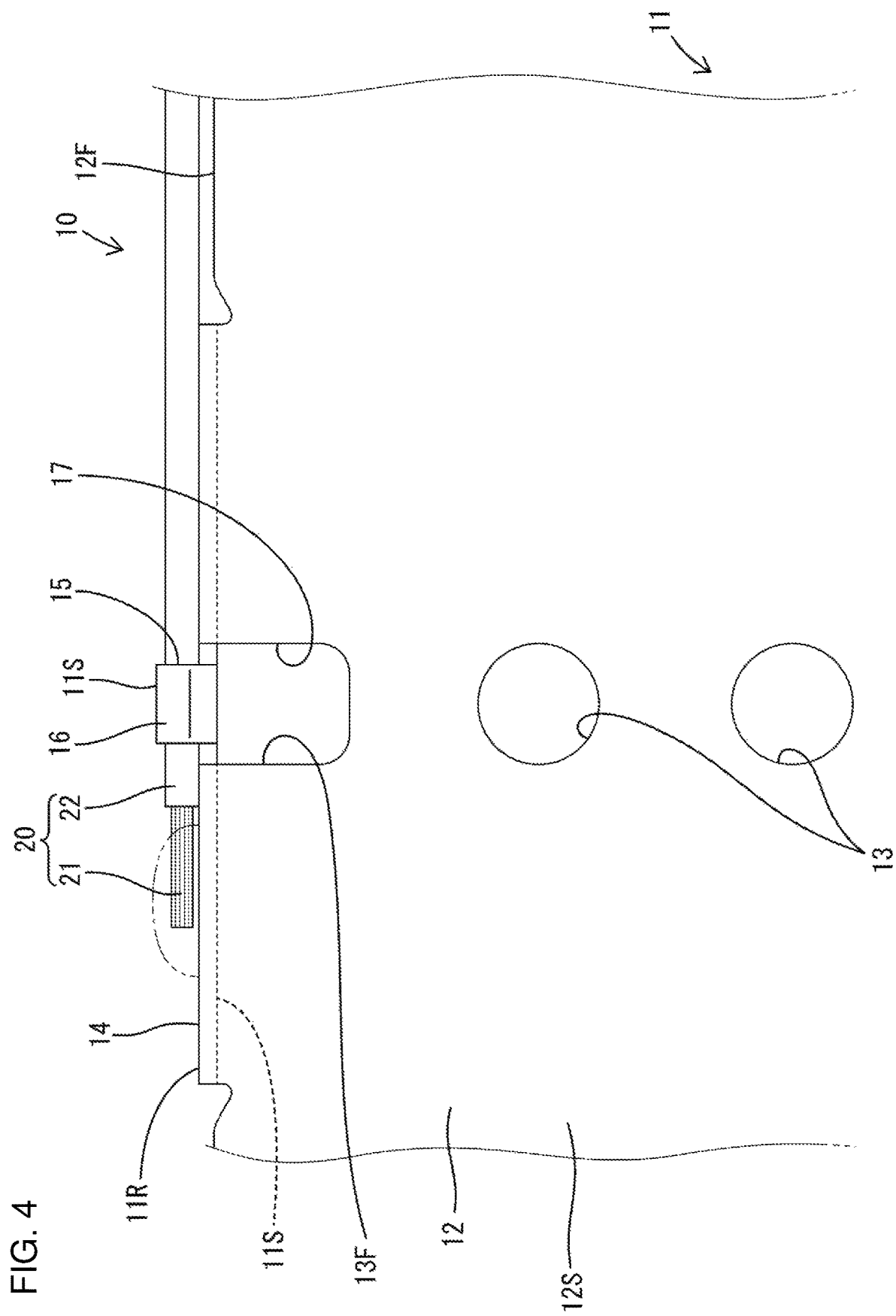
FIG. 4 is a partial enlarged bottom view of the busbar module.
Figure 5:
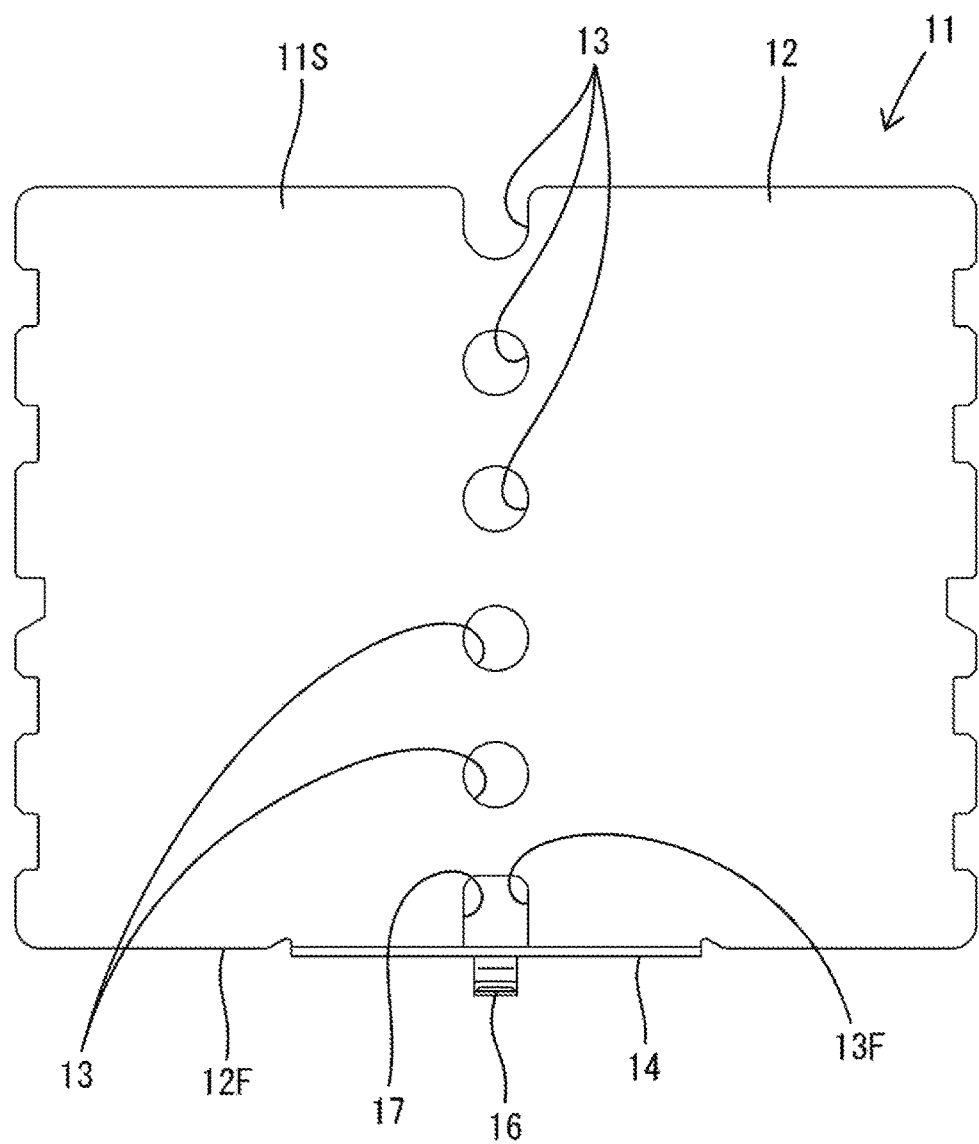
FIG. 5 is a plan view of the busbar.
Figure 6:
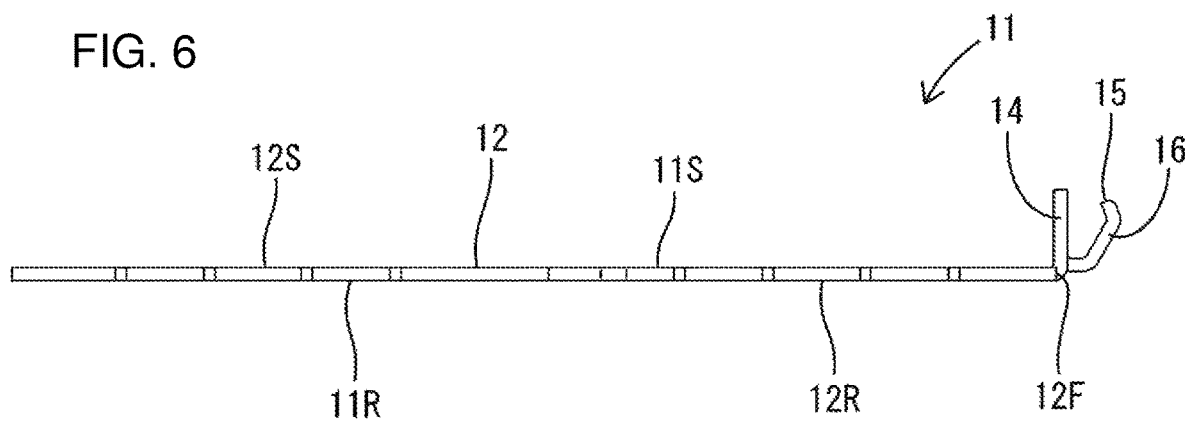
FIG. 6 is a side view of the busbar.
Figure 7:
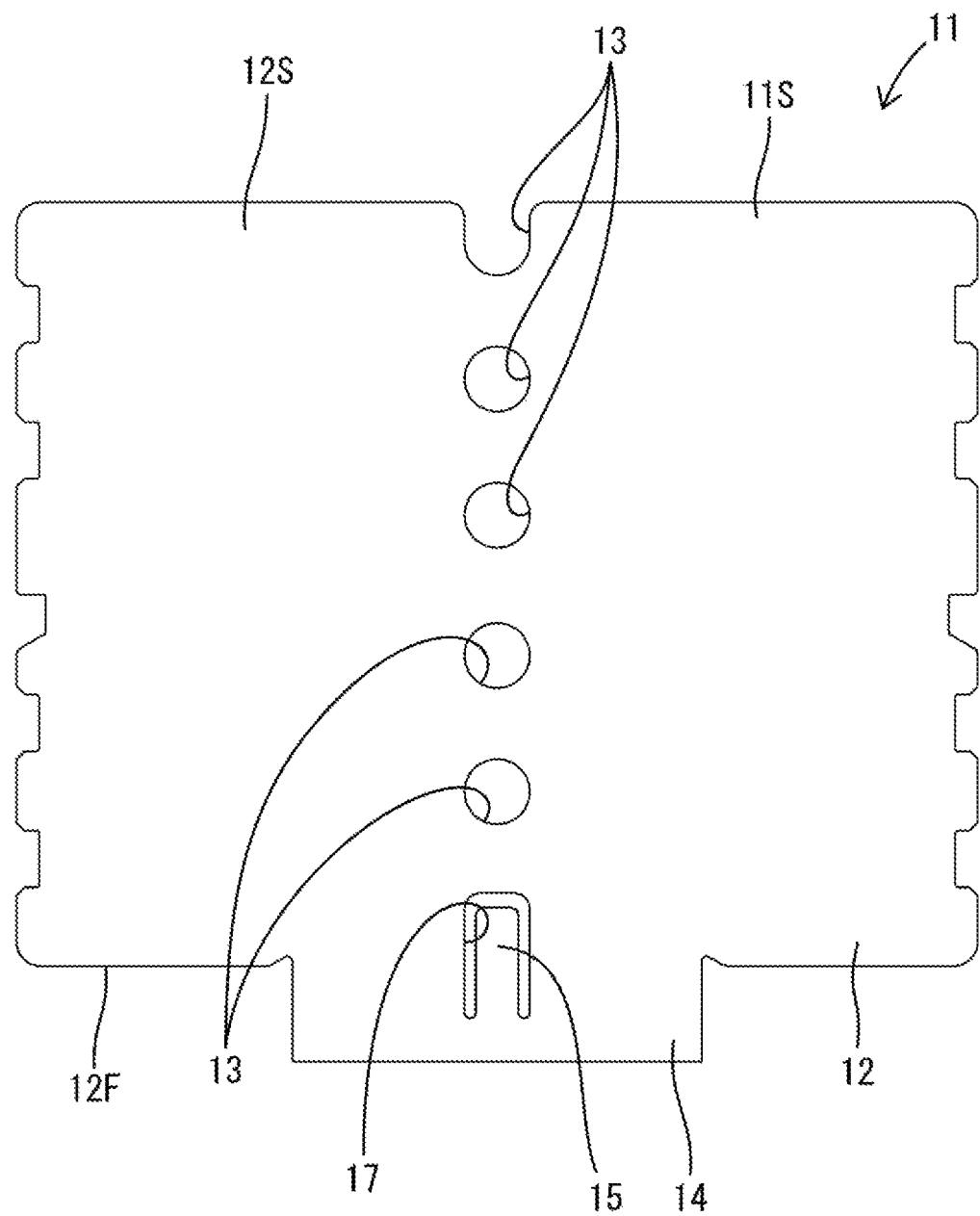
FIG. 7 is a development of the busbar.

One specific embodiment of the invention is described with reference to FIGS. 1 to 7. Note that, in the following description, a lower side in FIGS. 1, 2, 5 and 7 is defined as a front concerning a front-rear direction. Upper and lower sides shown in FIGS. 3 and 6 are defined as upper and lower sides concerning a vertical direction. Left and right sides shown in FIGS. 1 to 7 are defined as left and right sides concerning a lateral direction.

The busbar module 10 of this embodiment includes a busbar 11 as a single component made of a metal plate material and a wire 20 to be fixed to the busbar 11 and connected to a voltage detection circuit (not shown). Unillustrated positive and negative electrodes are provided on the upper surfaces of the battery cells 30 and the busbar 11 is connected electrically to the electrodes.

The busbar 11 is made of a clad material in which two types of (e.g. copper and aluminum) metal plate materials are linked and fixed to be flush with each other and arranged one in front of the other. The busbar 11 is formed by stamping the clad material into a predetermined shape by a press machine (not shown) and bending a stamped piece. In press working, the clad material is cut to produce burrs (not shown) on a top surface 11S of the busbar 11. The busbar 11 has a substantially rectangular plan view shape. The busbar 11 includes a plate-like body 12 having a substantially rectangular plan view shape, a supporting wall 14 rising substantially at a right angle from a front 12F (one side part constituting an outer edge part of a plate-like body as claimed) of the plate-like body portion 12 toward a top surface 12S, and one barrel 16.

One busbar 11 conductively connects the positive electrode and the negative electrode of two battery cells 30 adjacent in the front-rear direction with the plate-like body 12 horizontally oriented and a back surface 11R of the busbar 11 (plate-like body portion 12) faced down. Specifically, a back surface 12R in a front area of the plate-like body 12 is placed on the upper surface of the positive electrode of the front battery cell 30 of the two battery cells 30 adjacent in the front-rear direction, and is fixed conductively to the positive electrode by laser welding. The back surface 12R in a rear end area of the plate-like body 12 is placed on the upper surface of the negative electrode of the rear battery cell 30 and is fixed conductively to the negative electrode by laser welding.

Six through holes 13, 13F penetrate the plate-like body 12 from the back surface 12R to the top surface 12S of the plate-like body 12. The through holes 13 are formed at intervals in the front-rear direction at a laterally center position of the plate-like body 12. With the plate-like body 12 connected to the upper surfaces of the electrodes, the respective through holes 13, 13F expose parts of the upper surfaces of the electrodes.

The supporting wall 14 is in a laterally central part of the plate-like body 12 and a lateral dimension thereof is smaller than the entire width of the front part 12F of the plate-like body 12. The supporting wall 14 is bent toward the top surface 12S with respect to the plate-like body 12. A cut-and-raised portion 15 is formed on a front part of the plate-like body 12 by cutting and raising a laterally central part of the front part toward the back surface 12R and turning over the laterally central part forward (toward a side opposite to the plate-like body 12). The cut-and-raised portion 15 is turned over forward with the front end thereof as a support. The position of this support is at a lower end of the supporting wall 14 and substantially at the same height as the top surface 12S of the plate-like body 12.

The turned-over cut-and-raised portion 15 further is bent up, thereby forming the barrel 16 facing the front surface of the supporting wall 14. The barrel 16 is bent such that the top surface 12S where burrs may be produced is on an outer peripheral side (outer surface side). A space for sandwiching the wire 20 is secured between the inner peripheral surface of the barrel 16 (back surface 12R of the plate-like body 12) and the front surface of the supporting wall 14 (back surface 12R of the plate-like body 12). This space is open left, right and up.

Further, in the process of cutting and raising the barrel 16 (cut-and-raised portion 15), a cut-and-raised hole 17 is formed in an area of the plate-like body 12 where the cut-and-raised portion 15 was present. The cut-and-raised hole 17 is disposed in the front part 12F of the plate-like body 12 and penetrates from the back surface 12R to the top surface 12S of the plate-like body 12. This cut-and-raised hole 17 constitutes the through hole 13F located at a foremost position out of the six through holes 13, 13F.

That is, both the barrel 16 and the cut-and-raised hole 17 (through hole 13F) are formed by cutting and raising the cut-and-raised portion 15. In other words, the cut-and-raised portion 15 (barrel 16) is cantilevered from a part of a rectangular opening edge of the cut-and-raised hole 17 (through hole 13) formed in the plate-like body 12.

Next, the process of connecting the wire 20 to the busbar 11 is described. The wire 20 is a coated wire in which a core 21 formed of a metal twisted wire is surrounded by an insulation coating 22 made of synthetic resin. In connecting the wire 20 to the busbar module 10, an end processing is performed on an end part of the wire 20 to expose an end part of the core 21 by removing the insulation coating 22 along a predetermined length.

Subsequently, an end part of the wire 20 surrounded by the insulation coating 22 is fit between the barrel 16 and the supporting wall 14. At this time, an axis of the end part of the wire 20 is oriented in the lateral direction (direction substantially parallel to the front edge 12F and the supporting wall 14). Crimping then may be performed using an unillustrated tool. Thus, the insulation coating 22 of the wire 20 is sandwiched firmly between the barrel 16 and the supporting wall 14, and the wire 20 is fixed with a movement with respect to the busbar 11 restricted.

With the barrel 16 crimped to the wire 20, the core 21 is disposed near an area of the supporting wall 14 adjacent to the barrel 16. This core 21 is fixed conductively to the front surface of the supporting wall 14 by ultrasonic welding, soldering or the like. In the above manner, the wire 20 is mounted on the busbar 11 and an assembling operation of the busbar module 10 is completed.

As described above, the busbar module 10 of this embodiment includes the busbar 11 having the plate-like body 12 electrically connectable to the battery cells 30 (electrodes), the barrel 16 composed of the cut-and-raised portion 15 formed in the plate-like body 12 and the wire 20 fixed to the barrel 16. The busbar module 10 is an integral unit of the plate-like body 12 to be connected electrically to the battery cells 30 (electrodes) and the barrel 16 to be fixed to the wire 20.

Accordingly, the busbar module 10 and the busbar 11 of this embodiment can be reduced in weight as compared to the case where a component to be connected electrically to the battery cells 30 and a component to be fixed to the wire 20 are provided separately. Further, the barrel 16 is composed of an extending portion (cut-and-raised portion 15) formed by cutting and raising a part of the plate-like body 12. The cut-and-raised portion 15 is cantilevered from the plate-like body 12 so that a cut portion (cut-and-raised hole 17) is formed in an area of the plate-like body 12 adjacent to the cut-and-raised portion 15. Thus, the weight of the busbar 11 is reduced by as much as the area (cut-and-raised hole 17) of the plate-like body 12 cut by cutting and raising the cut-and-raised portion 15.

Further, the plate-like body 12 is connected to the battery cells 30 (electrodes) by laser welding and, with the plate-like body 12 connected to the battery cells 30 (electrodes), the cut-and-raised hole 17 open in the plate-like body 12 by forming the cut-and-raised portion 15 is disposed to expose a part (electrode) of the battery cell 30. According to this configuration, a positional relationship of the battery cells 30 (electrodes) and the busbar 11 on a horizontal plane can be confirmed by seeing the positions of the battery cells 30 (electrodes) through the through holes 13, 13F.

The busbar 11 includes the supporting wall 14 disposed along the front edge part 12F (outer edge) of the plate-like body 12, and the cut-and-raised portion 15 is formed in an area of the plate-like body 12 adjacent to the supporting wall 14. The wire 20 is sandwiched between the barrel 16 and the supporting wall 14. According to this configuration, the wire 20 can be fixed reliably between the barrel 16 and the supporting wall 14.

The insulation coating 22 of the wire 20 surrounding the core 21 is fixed to the barrel 16, and the core 21 is fixed conductively to the supporting wall 14. According to this configuration, a crimping step of fixing the insulation coating 22 to the barrel 16 and the supporting wall 14 and an ultrasonic welding or soldering step of fixing the core 21 to the supporting wall 14 can be performed reliably without interfering with each other.

The busbar 11 is stamped so that burrs are produced on the side of the top surface 12S do not contact the battery cells 30 (electrodes). The barrel 16 is bent to bring the side of the back surface 12R of the plate-like body 12 into contact with the wire 20. Accordingly, any burrs present on the outer peripheral side of the barrel 16 (on the side of the top surface 12S of the plate-like body 12), will not damage the wire 20.

The plate-like body 12 has a substantially rectangular shape and the barrel 16 is disposed on the straight outer front edge 12F of the plate-like body 12. The wire 20 having an axis oriented substantially parallel to the front edge 12F is fixed to the barrel portion 16. If the barrel 16 is arranged near the left end of the front edge 12F of the plate-like body 12 and the wire 20 is drawn out leftward from the barrel 16, there is a concern about a situation where the wire 20 has to be bent with a small radius of curvature near the barrel 16, i.e. near a left end part of the plate-like body 12. If this occurs, stress concentrates on a part of the barrel 16 crimped to the wire 20, and countermeasures are necessary.

In view of the above problem, the barrel 16 is disposed substantially at a center position of the front edge part 12F of the plate-like body 12 in the busbar module 10 of this embodiment. Thus, an area of the wire 20 along the front edge part 12F need not be bent with an extremely small radius of curvature regardless of whether the wire 20 is set to be drawn out leftward or rightward from the barrel 16. This can prevent the concentration of stress on the part of the barrel 16 crimped to the wire 20.

The invention is not limited to the above described and illustrated embodiment. For example, the following embodiments are also included in the scope of the invention.

One busbar conductively connects a positive electrode of one battery cell and a negative electrode of another battery cell in the above embodiment. However, the invention can also be applied to a busbar for conductively connecting positive electrodes of a plurality of battery cells and negative electrodes of another plurality of battery cells.

Only the insulation coating of the wire is fixed to the barrel in the above embodiment. However, the insulation coating and the core may be fixed to one barrel, the insulation coating and the core may be fixed individually to two barrels, or only the core may be fixed to one barrel.

Although the supporting wall rises substantially at a right angle to the plate-like body portion in the above embodiment, the supporting wall portion may be oblique to the plate-like body portion or flush with the plate-like body portion.

The insulation coating is sandwiched between the barrel and the supporting wall in the above embodiment. However, the wire may be fixed to the busbar only by the barrel without providing the supporting wall.

Although the barrel is disposed in the longitudinally central part of the front edge part of the plate-like body in the above embodiment, the barrel may be disposed on one longitudinal end part of the front edge part of the plate-like body.

Although the barrel is disposed on the outer edge part of the plate-like body in the above embodiment, the barrel may be closer to a center than the outer edge part.

The busbar is made of the clad material in which two types of metal plate materials are fixed to be flush with each other in the above embodiment. However, the invention can also be applied to a busbar made of a single type of metal plate material.

Although the plate-like body is connected to the battery cells (electrodes) by laser welding in the above embodiment, the plate-like body may be connected by ultrasonic welding, solder welding or the like.

LIST OF REFERENCE SIGNS

10 . . . busbar module
11 . . . busbar
12 . . . plate-like body
12F . . . front edge part (one side part constituting outer edge part of plate-like body)
12R . . . back surface of plate-like body
12S . . . top surface of plate-like body
14 . . . supporting wall portion
15 . . . cut-and-raised portion
16 . . . barrel
17 . . . cut-and-raised hole
20 . . . wire
21 . . . core
22 . . . insulation coating
30 . . . battery cell

What is claimed is:

1. A busbar module, comprising:
   a busbar including a plate-like body having opposite top and back surfaces, the busbar being stamped such that burrs are produced on the top surface of the plate-like body, the back surface of the being brought into contact with the battery cells and being electrically connectable to battery cells;
   a barrel composed of a cut-and-raised portion formed on the plate-like body; and
   a wire fixed to the barrel and in contact with the back surface of the plate-like body.

2. The busbar module of claim 1, wherein:
   the plate-like body is connected to the battery cells by welding; and
   a cut-and-raised hole open in the plate-like body by forming the cut-and-raised portion is disposed to expose a part of one of the battery cells with the plate-like body connected to the battery cells.

3. The busbar module of claim 2, further comprising a supporting wall disposed along an outer edge part of the plate-like body, wherein:
   the cut-and-raised portion is formed in an area of the plate-like body adjacent to the supporting wall; and
   the wire is sandwiched between the barrel and the supporting wall.

4. The busbar module of claim 3, wherein:
   an insulation coating of the wire surrounding a core is fixed to the barrel; and
   the core is conductively fixed to the supporting wall.

5. The busbar module of claim 1, wherein:
   the plate-like body is substantially rectangular;
   the barrel is disposed substantially at a center position of one straight side part constituting an outer edge of the plate-like body; and
   the wire having an axis oriented substantially in parallel to the outer edge is fixed to the barrel.

6. A busbar module, comprising:
   a busbar including a plate-like body electrically connectable to battery cells;
   a supporting wall disposed along an outer edge of the plate-like body;
   a barrel formed of a cut-and-raised portion formed in an area of the plate-like body adjacent to the supporting wall; and
   a wire fixed to the barrel by being sandwiched between the barrel and the supporting wall.

7. The busbar module of claim 6, wherein:
   an insulation coating of the wire surrounding a core is fixed to the barrel; and
   the core is conductively fixed to the supporting wall.

8. The busbar module of claim 6, wherein:
   the busbar is stamped such that burrs are produced on a top surface side of the plate-like body not to be brought into contact with the battery cells; and
   the barrel is bent so that a back surface of the plate-like body is in contact with the wire.

9. A busbar module, comprising:
a substantially rectangular plate-like body that is electrically connectable to battery cells;
a barrel composed of a cut-and-raised portion disposed substantially at a center position of one straight side part constituting an outer edge of the plate-like body; and
a wire fixed to the barrel so that an axis of the wire is oriented substantially in parallel to the outer edge of the plate-like body.

* * * * *